United States Patent

Chang et al.

[11] Patent Number: 6,111,989
[45] Date of Patent: Aug. 29, 2000

[54] 1/4 SIZE REAL TIME DECODING OF DIGITAL VIDEO

[75] Inventors: Ching-Fang Chang, San Jose, Calif.; Naofumi Yanagihara, Tokyo, Japan

[73] Assignees: Sony Corporation, Tokyo, Japan; Sony Electronics, Inc., Park Ridge, N.J.

[21] Appl. No.: 08/970,880

[22] Filed: Nov. 14, 1997

[51] Int. Cl.[7] ............................... H04N 7/12; G06K 9/36
[52] U.S. Cl. .......................... 382/250; 382/233; 348/403
[58] Field of Search ..................................... 382/233, 250; 348/403, 405, 420, 408; 358/435, 427, 432; 386/124, 40

[56] References Cited

U.S. PATENT DOCUMENTS

| | | | |
|---|---|---|---|
| 5,073,821 | 12/1991 | Juri | 348/405 |
| 5,870,144 | 2/1999 | Guerrara | 348/403 |
| 5,957,998 | 9/1999 | Ozaki | 382/250 |

OTHER PUBLICATIONS

Gonzalez, R. C. et al. "Digital Image Processing," Addison–Wesley, Reading, MA (1977) pp. 102–103.

"Specifications of Consumer–Used Digital VCRs using 6.3 mm Magnetic Tape", HD digital VCR Conference, (Dec. 1994).

*Primary Examiner*—Thomas D. Lee
*Assistant Examiner*—Wenpeng Chen
*Attorney, Agent, or Firm*—Blakley, Sokoloff, Taylor & Zafman LLP

[57] ABSTRACT

A system and method to decode encoded video images in such a manner as to maintain high quality images while reducing the computation time needed to decode the images. The system takes into account that the resultant display generated may only have a fraction (¼) of the resolution of the original image. Thus, optimizations are realized by modifying and combining the inverse discrete cosine transform (IDCT) and inverse weighting (IW) processes to process only the portion of the image to be displayed.

30 Claims, 11 Drawing Sheets

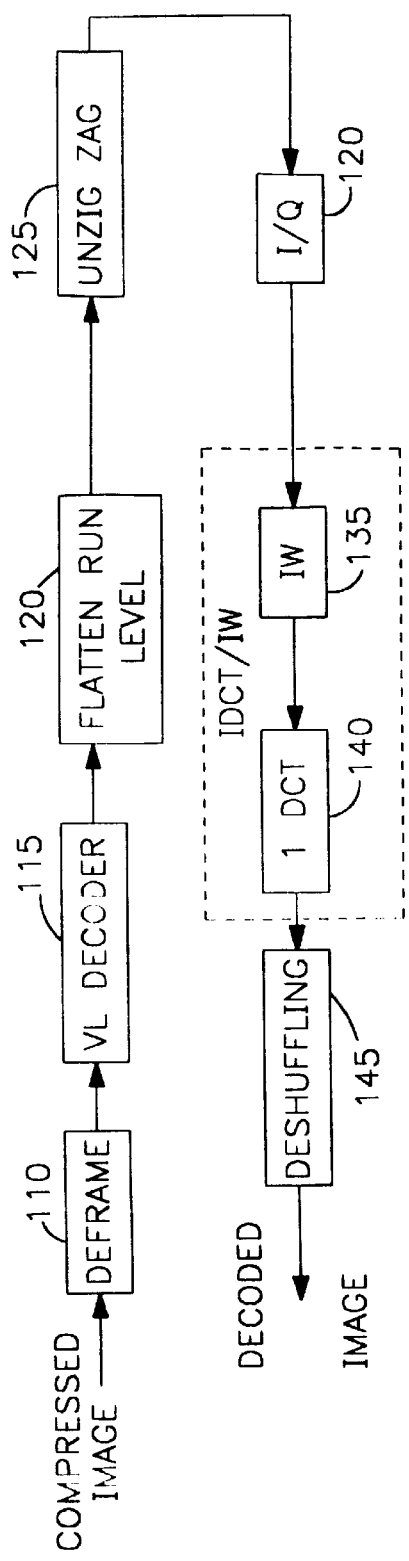
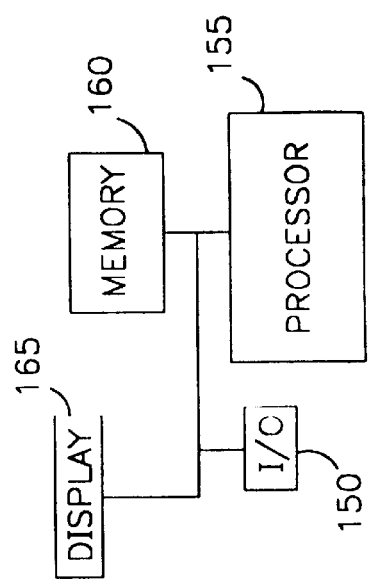
FIG. 1a
FIG. 1b $$P(x,y) = \frac{1}{4}\sum_{v=0}^{3}\left\{\frac{C'(v)}{w(v)}\cos\frac{\pi v(4y+1)}{16}\left[\sum_{h=0}^{3}\left(\frac{C'(h)}{w(h)}\cos\left(\frac{\pi h(2x+1)}{8}\right)Q''(h,v)\right)\right]\right\}$$

905

906

907

$$P(x,y) = \frac{1}{4}\sum_{h=0}^{3}\left\{\frac{C'(h)}{w(h)}\cos\left(\frac{\pi h(2x+1)}{8}\right)\left[\sum_{v=0}^{3}\left(\frac{C'(v)}{w(v)}\cos\left(\frac{\pi v(4y+1)}{16}\right)Q''(h,v)\right)\right]\right\}$$

910

911

912

915 where  x = 0,1,2,3
       y = 0,1,2,3

$$C'(h) = \begin{cases} 1, & h = 0 \\ \sqrt{2}, & h = 1,2,3 \end{cases}$$

$$Q''(h,v) = \begin{cases} 2Q(h,v), & h=0, v=0 \\ Q(h,v), & others \end{cases}$$

w(0) = 1
w(1) = CS4/(4 * CS7 * CS2)
w(2) = CS4/(2 * CS6)
w(3) = 1/(2 * CS5)
CSm = cos(mπ/16)

FIG. 9a

$$P(x,y) = \frac{1}{4}\sum_{v=0}^{3}\left\{\frac{C(v)}{w(2v)}\cos\frac{\pi v(2y+1)}{8}\left[\sum_{h=0}^{3}\left(\frac{C(h)}{w(h)}\cos\left(\frac{\pi h(2x+1)}{8}\right)(Q''(h,v)+Q''(h,v+4))\right)\right]\right\}$$

925 — 926, 927

$$P(x,y) = \frac{1}{4}\sum_{h=0}^{3}\left\{\frac{C(h)}{w(h)}\cos\frac{\pi h(2x+1)}{8}\left[\sum_{v=0}^{3}\left(\frac{C(v)}{w(2v)}\cos\left(\frac{\pi v(2y+1)}{8}\right)Q''(h,v)+Q''(h,v+4)\right)\right]\right\}$$

920 — 921, 922 where  x = 0,1,2,3
       y = 0,1,2,3

$$C(h) = \begin{cases} 1, & h=0 \\ \sqrt{2}, & h=1,2,3 \end{cases}$$

$$Q''(h,v) = \begin{cases} 2Q(h,v), & h=0, v=0 \\ Q(h,v), & \text{others} \end{cases}$$

w(0) = 1
w(1) = CS4/(4 * CS7 * CS2)
w(2) = CS4/(2 * CS6)
w(3) = 1/(2 * CS5)
w(4) = 7/8
w(6) = CS4/CS2
CSm = cos(mπ/16)

1/4 SIZE REAL TIME DECODING OF DIGITAL VIDEO

BACKGROUND OF THE INVENTION

1. Field of the Invention

The present invention relates to the decoding of digital video images.

2. Art Background

Video images in digital format, referred to frequently as digital video (DV) is achieving greater usage as the use of computers for developing video images increases. The digital video data is stored or transmitted in a compressed encoded format, often referred to as "DV" format. The encoding process typically includes a discrete cosine transform (DCT) to translate the pixel data into DCT coefficients and a weighting function to weight the values (See e.g., "Specifications of Consumer-Used Digital VCRs Using 6.3 mm Magnetic Tape", HD Digital VCR Conference, (December 1994)). After the data is decoded, the image is sized for the viewing window, for example, by using a pixel decimation process wherein specified spatially spaced pixels are removed to reduce the number of pixels representative of the image. Thus, a number of pixels decoded are not subsequently displayed.

The decoding process is time consuming due to the number of operations required to decode the data. Thus it is desirable to minimize the time required to perform the decoding process while maintaining a high quality image.

SUMMARY OF THE INVENTION

The system and method of the present invention decodes encoded video images in such a manner as to maintain high quality images while reducing the computation time needed to decode the images. The system takes into account that the resultant display generated may only have a fraction of the resolution of the original image. Thus, optimizations are realized by modifying and combining the inverse discrete cosine transform (IDCT) and inverse weighting (IW) processes to process only the portion of the image to be displayed.

In one embodiment of a decoding of a ¼ size image, a horizontal 4-point IW/IDCT process is applied to the lower four coefficients in each of the first four rows in an 8×8 matrix of transformed coefficients, referred to herein as a block, which is part of a frame of video. A vertical 8-point IW/IDCT process is applied to all eight coefficients in each of the first four columns with the higher four coefficients in each column set to a value of zero.

In an alternate embodiment, when the input block consists of two 4×8 matrices of sum and difference coefficients, a horizontal 4-point IW/IDCT is applied to the coefficients. A vertical 4-point IW/IDCT is applied to the sums of corresponding sum and difference coefficients.

BRIEF DESCRIPTION OF THE DRAWINGS

The objects, features and advantages of the present invention will be apparent to one skilled in the art from the following detailed description in which:

FIG. 1a is a simplified block diagram of one embodiment of a decoder which operates in accordance with the teachings of the present invention, and FIG. 1b is a simplified block diagram of a general purpose computer that operates in accordance with the teachings of the present invention.

FIG. 9a and FIG. 9b illustrate mathematical implementations of the flow diagram of FIG. 2 and FIG. 5, respectively.

DETAILED DESCRIPTION

Figure 2:
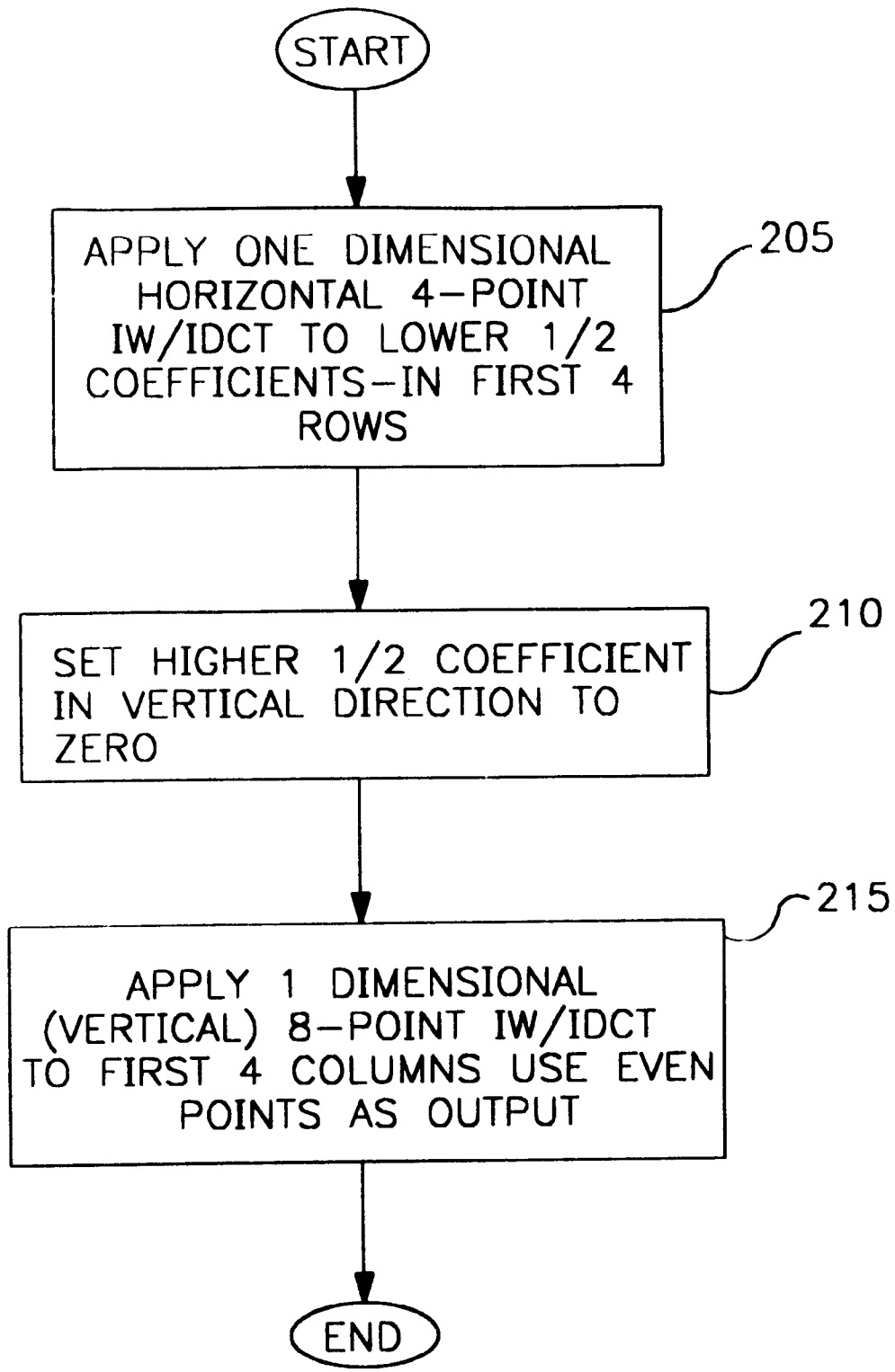
FIG. 2 is a flow diagram illustrating one embodiment of the method of the present invention to perform a combined inverse cosine transform and inverse weighting function on an 8×8 block of coefficients.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention unnecessarily.

FIG. 1a illustrates, in simplified block diagram form, one implementation of the decoding circuitry of the present invention. It is readily apparent that the present invention can be implemented in a dedicated microcontroller circuit in logic circuitry or software operable on a general purpose computer. The applications of such decoders are varied. For example, the decoder may be implemented in a computer system that receives digital video signals from an external source such as satellite, broadcasts or digital video players. Alternately, the decoder circuitry may be embodied in digital video player recorders, cameras or other digital video equipment.

Referring to FIG. 1a, the compressed image is input to a deframing subcircuit 110, which unpacks every five fixed-length synchronization blocks into thirty blocks of variable-length coded quantized coefficients. A block is a portion of a frame of video image. In the present embodiment, each encoded block is a matrix of 8×8 discrete cosine transform (DCT) coefficients. In an alternate embodiment, each block consists of two matrices of 4×8 DCT coefficients, one matrix containing sum coefficients and one matrix containing difference coefficients. VL decoder 115 performs a variable length decoding process in accordance with teachings known in the art to generate run-level pairs of DCT coefficients. The flatten run-level circuit 120 expands the run-level pairs into individual DCT coefficients. For example, if a run-level pair sequence consists of (2,2), (4,1), the flattened representation consists of (0,0,2), (0,0,0,0,1). The unzig-zag subcircuit 125 receives the one-dimensional representation of the quantized coefficients and turns it into a two-dimensional representation. The I/Q subcircuit performs an inverse quantization process on the DCT coefficients. The inverse weighting (IW) function 135 inversely weights the coefficients that originally were weighted during the encoding process. One example of the weighting performed is described in "Specifications of Consumer-Used Digital VCRs Using 6.3 mm Magnetic Tape", HD Digital VCR Conference, (December 1994), page 28.

An inverse discrete cosine transform (IDCT) 140 is then applied to transform the DCT coefficients into pixel values. Once the pixel values are generated, a deshuffling process 145 is applied to generate the completed image. The subcircuits 110, 115, 120, 125, 130 and 145 may be embodied a variety of ways known to one skilled in the art and will not be discussed further herein. For further information see, for example, "Specifications of Consumer-Used Digital VCRs Using 6.3 mm Magnetic Tape", HD Digital VCR Conference, (December 1994).

As will be explained below, an innovative combination of inverse weighting (IW) and inverse discrete cosine transform implementation has been developed to provide high quality reduced-sized images with minimal processing overhead. As noted earlier, the present invention also may be implemented on a general purpose computer as illustrated in FIG. 1b.

In this embodiment, the compressed image is received through input port circuitry 150 which forwards the data to the processor 155 which executes instructions from memory 160 to perform the steps described, and in some embodiments, display the decoded image on display 165.

FIG. 2 is a simplified flow diagram of one embodiment of the innovative process for decoding a ¼ size image in accordance with the teachings of the present invention. The embodiments described herein combine the application of the inverse weighting (IW) and inverse discrete cosine transforms (IDCT) into one function. The advantage to this is that the number of multiplications or computations required is reduced. However, it should be realized that the IW and IDCT of the processes described herein can be applied in a serial manner.

Figure 3:
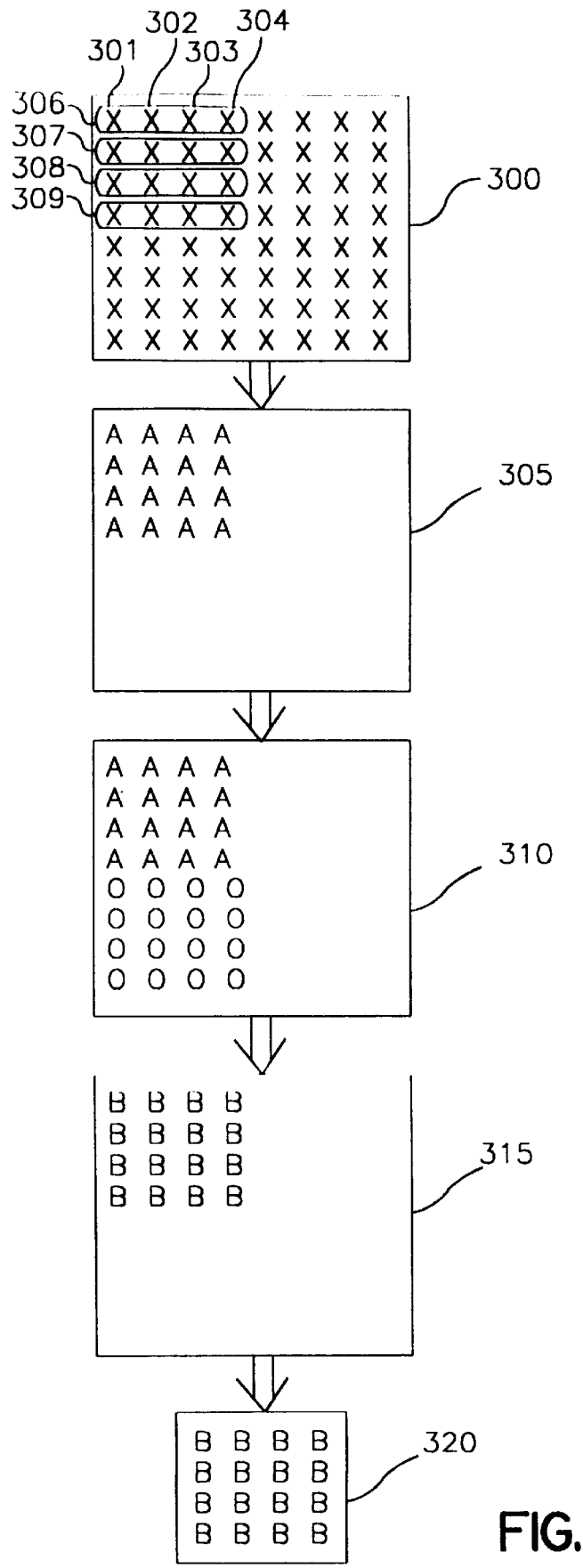
FIG. 3 is a diagram illustrating the coefficients processed in accordance with the flow diagram of FIG. 2.

Referring to FIG. 2, at step 205, a one-dimensional (1D) horizontal 4-point IW/IDCT function is applied four times to the lower half, in this embodiment, four, coefficients in the matrix. This is graphically illustrated with respect to FIG. 3.

Matrix 300 is representative of an 8×8 block of DCT coefficients representative of a portion of an image where x represents an encoded coefficient. The index of the matrix 300 increases from left to right and from top to bottom. The coefficients with smaller indices are referred as lower coefficients. The coefficients with larger indices are referred as higher coefficients. Block 305 is representative of the block after application of the 4-point IW/IDCT as set forth at step 205. Referring to block 305, the "A" coefficient is representative of the DCT coefficients after application of the 4-point 1D horizontal IW/IDCT. It should be noted that the present embodiment describes the process with respect to an 8×8 block; however it is contemplated that the process may be applied to n×m blocks, where n is greater than or equal to 4 and m is greater than or equal to 4.

Figure 4A:
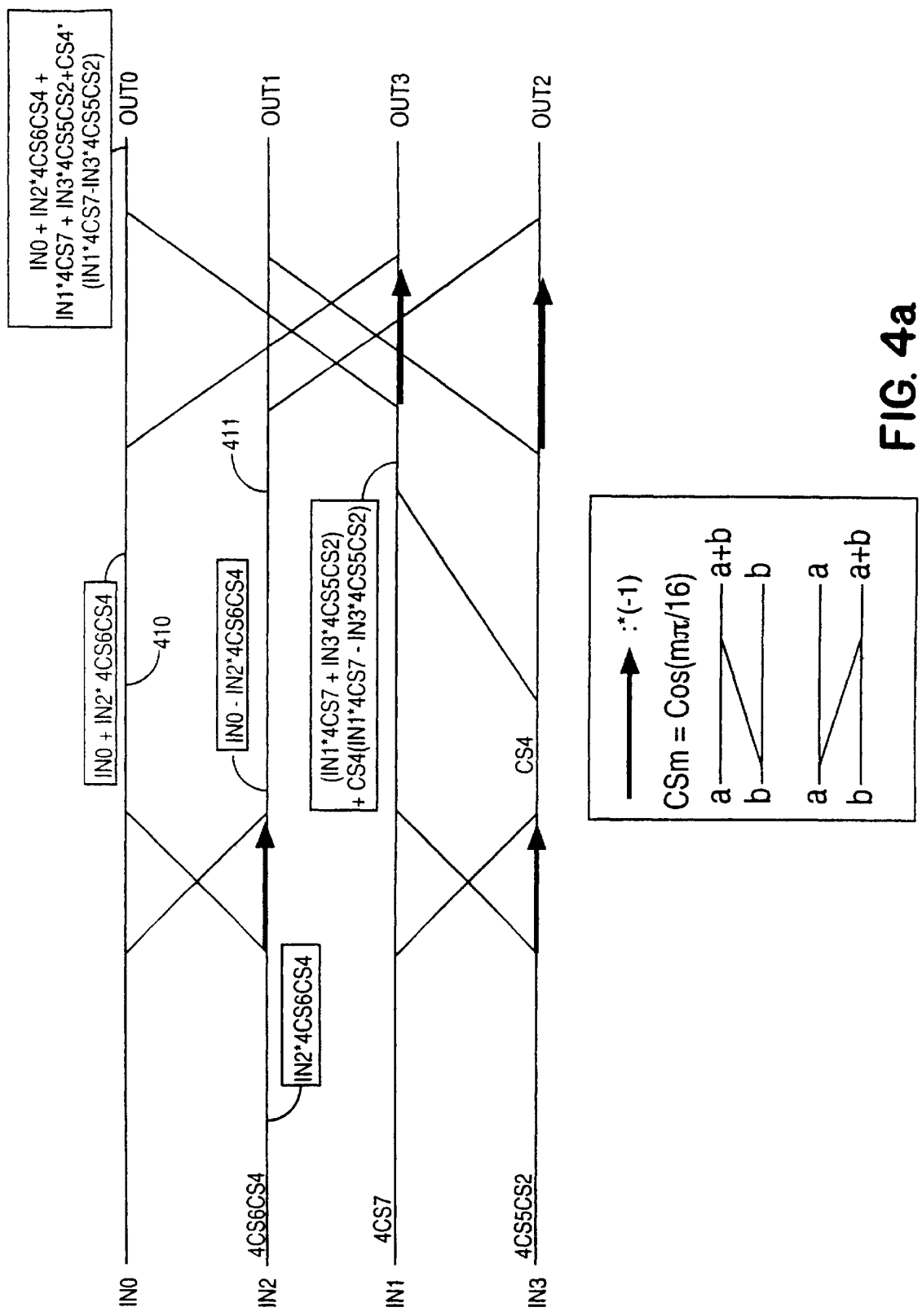
FIG. 4a and FIG. 4b are a butterfly diagrams illustrating one embodiment of the combined one-dimensional 4-point inverse cosine transform and inverse weighting function utilized in accordance with the flow diagram of FIG. 2.

FIG. 4a is representative of one example of a 4-point IW/IDCT applied at step 205 of FIG. 2. IN0, IN1, IN2 and IN3 correspond to locations 301, 302, 303, 304 in each row 306, 307, 308, 309. This particular embodiment of the 4-point IW/IDCT is specified to decode a digital video image encoded in accordance with the specification set forth in "Specifications of Consumer-Used Digital VCRs Using 6.3 mm Magnetic Tape", HD Digital VCR Conference, (December 1994). It should be readily apparent that the 4-point IW/IDCT applied may vary according to the particular encoding process utilized.

The IW/IDCT depicted in FIG. 4a is represented in a form known as a butterfly where, $$CSi = \frac{\cos i\pi}{16},$$

a diagonal line is representative of an addition operation, an arrow is representative of a multiplication operation by a −1, and values along the line represent a multiplication operation by the noted values. For example, with respect to FIG. 4a, at stage 410, the modifications performed on the input IN0 correspond to IN0+4CS6CS4*IN2 where 4CS6CS4 is equal to 4*CS6*CS4. At a corresponding point stage 411, the modifications performed on IN2 equals IN0−IN2*4CS6CS4. Following through with respect to output 0 (OUT0), output 0 equals IN0+IN2*4CS6CS4+IN1*4CS7+IN3*4CS5CS2+CS4*(IN1*4CS7−IN3*4CS5CS2); where 4CS5CS2=4*CS5*CS2.

Referring back to FIG. 2, at step 210, the higher half, e.g., 4, coefficients in the vertical direction are set to zero. This is graphically represented by block 310 of FIG. 3. It should be noted that it is preferred that the remaining unprocessed coefficients are essentially ignored (as shown by omission in blocks 305, 310, 315) to save additional processing time as the coefficients are not used. At Step 215, an 8-point IW/IDCT is applied vertically. This is illustrated at block 315, which shows that the coefficients represented by the variable B result in pixel data at even coordinates after the 8-point IW/IDCT. The 8-point IW/IDCT implemented in the present embodiment is represented by the butterfly diagram of FIG. 4b. It should be noted that the sequence of operations is interchangeable; thus the horizontal IW/IDCT applied can be applied after application of the vertical 8-point IW/IDCT.

Referring back to FIG. 3, after application of the vertical 8-point IW/IDCT, the 4×4 image generated, represented by block 320, contains a high quality portion of the image. This quality image was generated with minimum processing overhead. Thus substantial time savings is realized.

Figure 5:
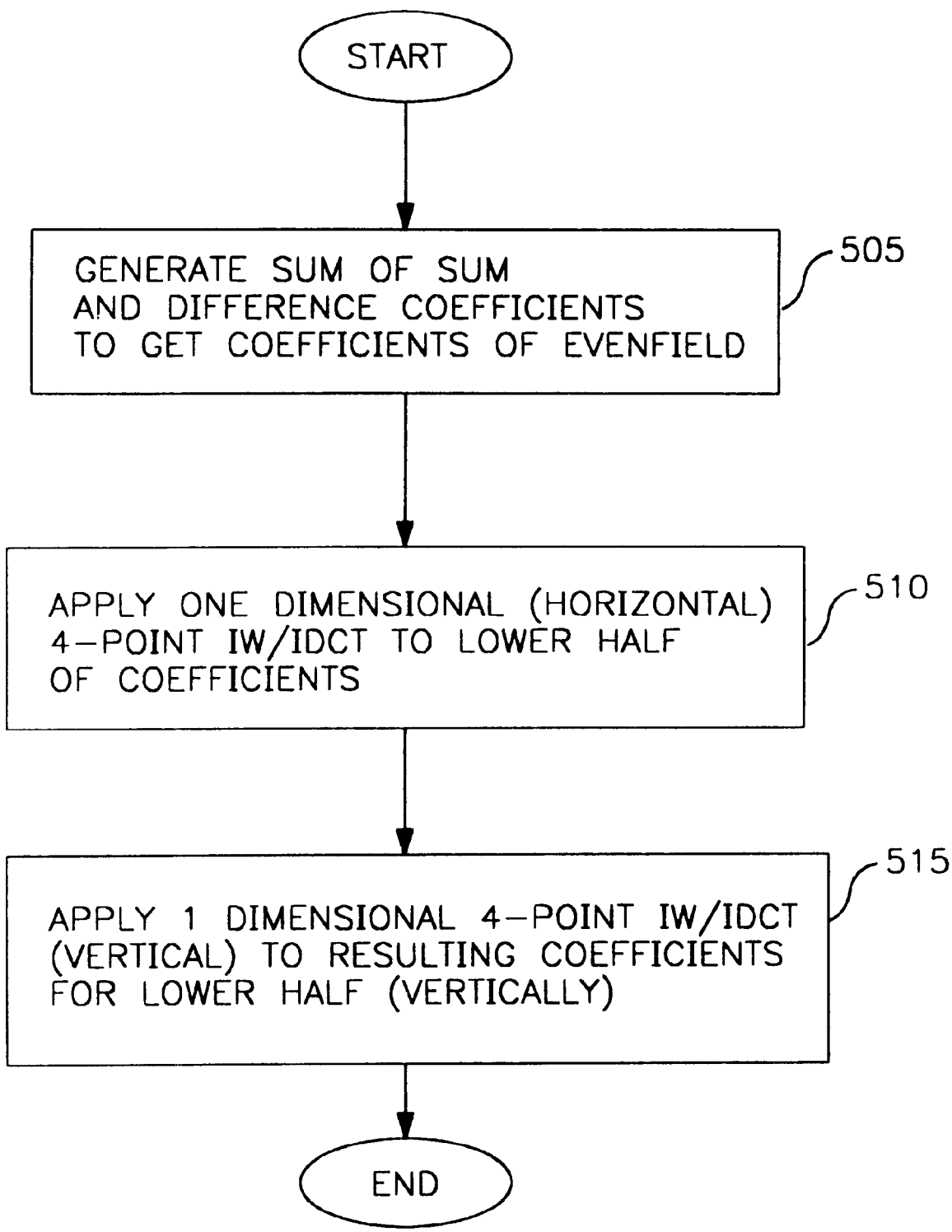
FIG. 5 is a flow diagram illustrating an alternate embodiment of the method the present invention that performs a combined inverse cosine transform and inverse weighting function on two 4×8 matrices of sum and difference coefficients.

An alternate embodiment is shown with respect to FIG. 5. FIG. 5 processes a representation of an image which is formed by two 4×8 blocks. One 4×8 block consists of sum DCT coefficients and one 4×8 block consists of difference DCT coefficients. The use of 4×8 blocks is defined in "Specifications of Consumer-Used Digital VCRs Using 6.3 mm Magnetic Tape", HD Digital VCR Conference, (December 1994), pages 27 and 84. It is contemplated that blocks of m×n dimensions may be used, where m is greater than or equal to 4 and n is greater than or equal to 4.

Figure 6:
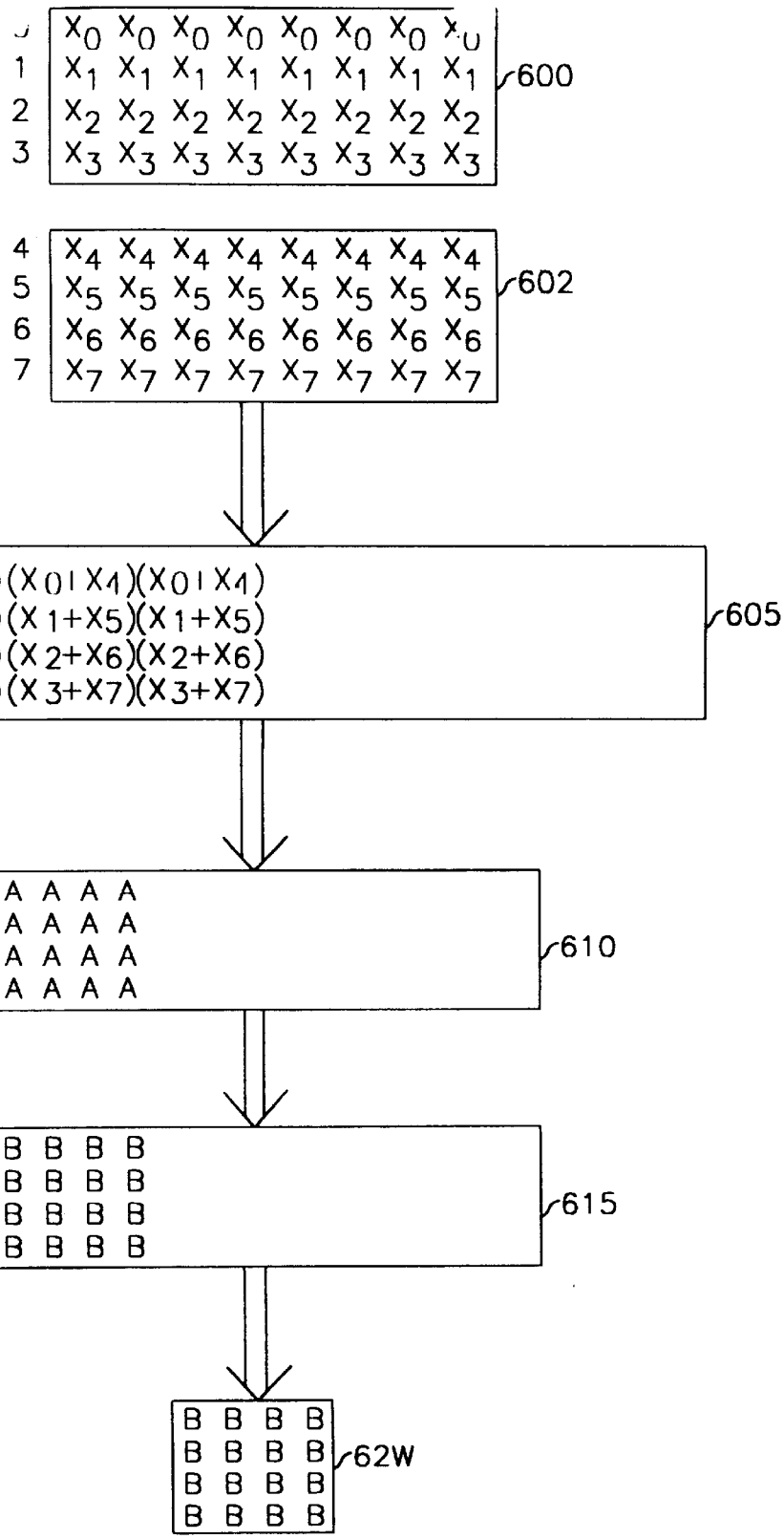
FIG. 6 is a diagram illustrating the coefficients processed in accordance with the flow diagram of FIG. 5.

At step 505, a sum of each sum and corresponding difference coefficients are generated to get the coefficients of the even field. Referring to FIG. 6, blocks 600 and 602 are the original sum and difference coefficients, respectively. Block 605 shows the sum of the sum and corresponding difference coefficients e.g., X0+X4 of each column, where 0 represents row 0 and 4 represents row 4. It is preferred, in order to realize further time savings as 4-point IW/IDCTs are subsequently applied, that horizontally only the lower half of the sum and difference coefficients are summed.

At step 510 a one-dimensional horizontal 4-point IW/IDCT is applied to the lower half, in the present embodiment, four, coefficients. Block 610 contains the summed coefficients (identified by "A" variable) modified after application of the one-dimensional horizontal 4-point IW/IDCT. Preferably, the 4-point IW/IDCT used is the same as that utilized in the prior process and is represented by the butterfly diagram of FIG. 4a.

Figure 7:
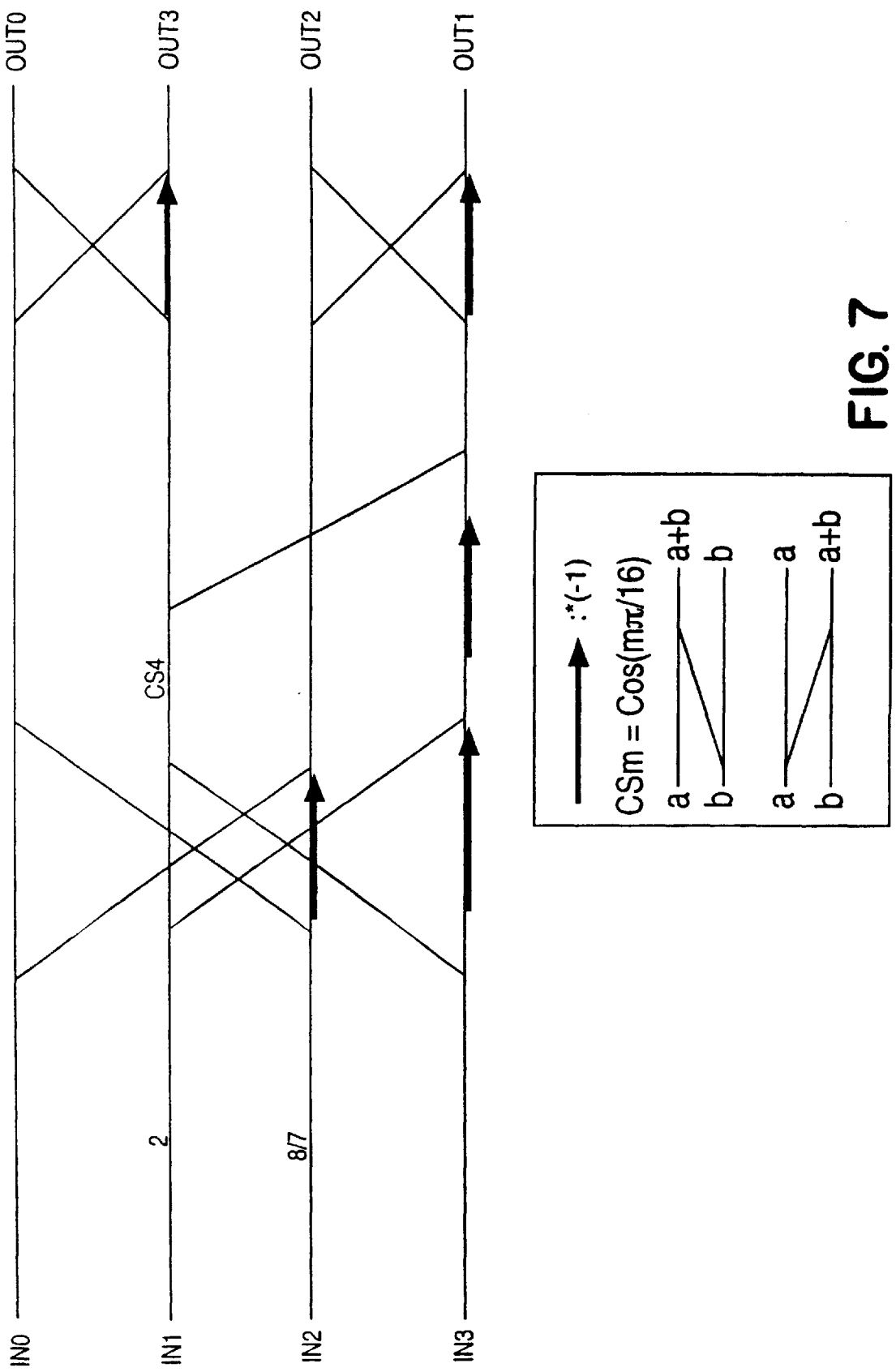
FIG. 7 is a butterfly diagram illustrating one embodiment of a vertical inverse discrete cosine transform and inverse weighting function utilized in accordance with the flow diagram of FIG. 5.

At step 515, a 4-point IW/IDCT is vertically applied four times to the lower half of the coefficients represented in block 610 to generate the pixel data ("B") shown in block 615. One example of a 4-point IW/IDCT vertically applied is represented in FIG. 7. The IW/IDCT applied differs from that earlier described as the weighting function specified for encoding and therefore the decoding process is slightly different for the two 4×8 block representations.

Block 620 represents the portion displayed 4×4 image portion generated. It should be noted that steps 505, 510 and 515 are not sequentially dependent; thus, for example, step 510 can be performed before step 505 and 515. Likewise, step 515 can be performed before steps 505 and 510. Step 515 can also be performed before 510 and after 505. Thus, the sequencing is interchangeable. Although the sequence can be changed, the sequence of operations affects the total number of computations required. For example, if step 510 is performed before step 505, the horizontal IW/IDCT is applied to the sum and difference coefficients (e.g., 8 rows of data) effectively doubling the number of computations.

Figure 4B:
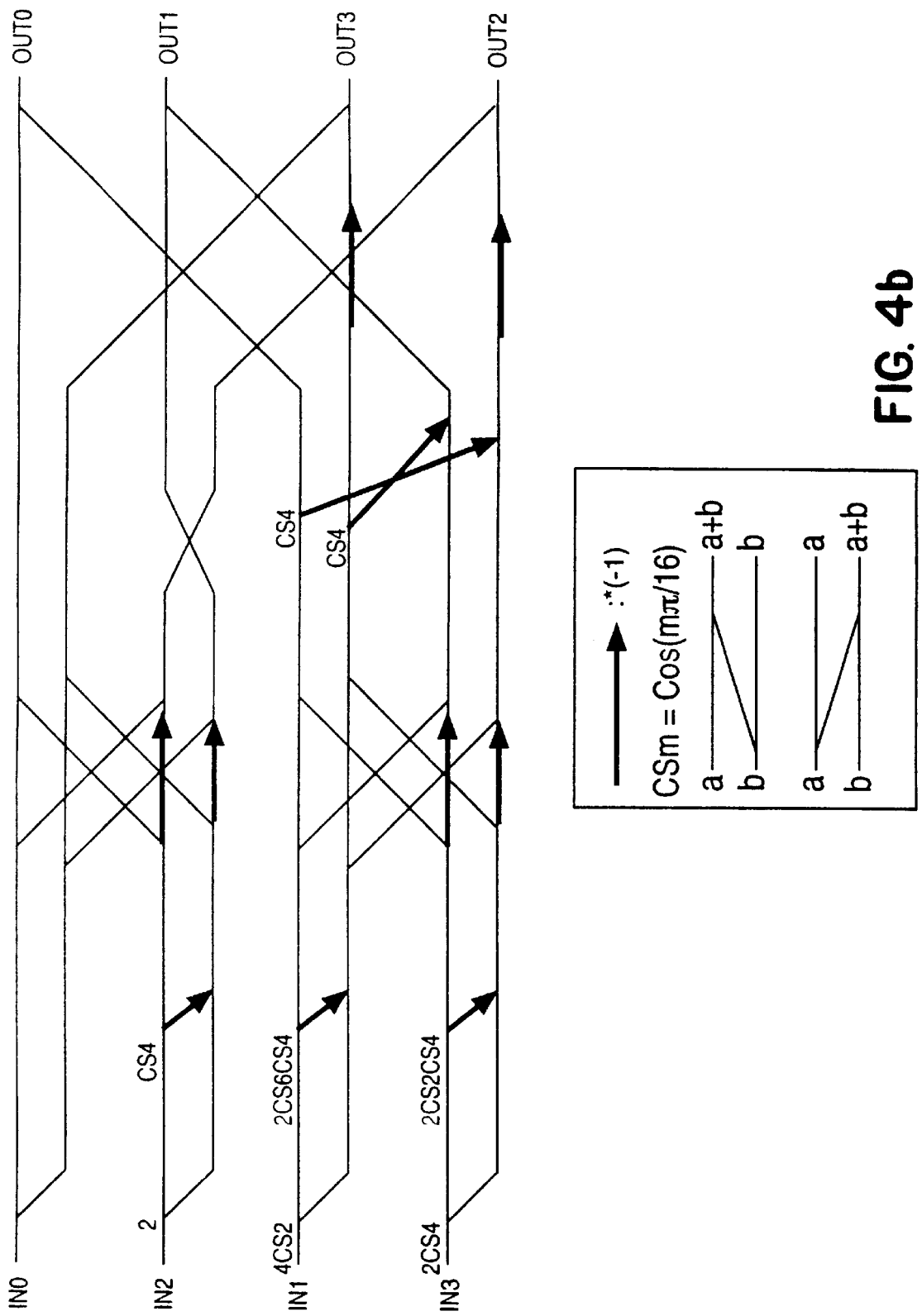
Figure 8:
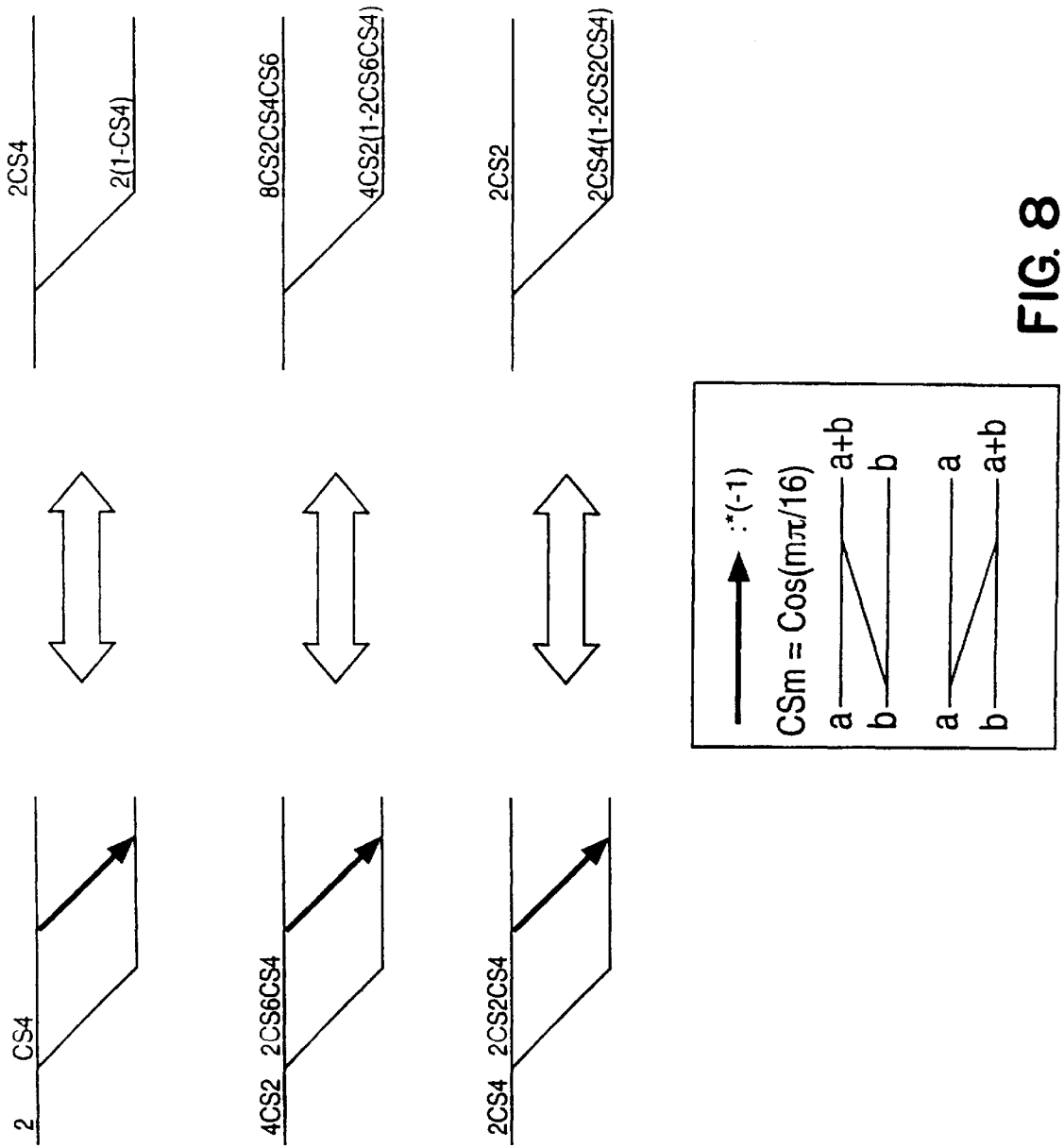
FIG. 8 illustrate alternate representations of butterfly diagrams.

It should be noted that the butterfly diagrams shown in FIGS. 4a, 4b and 7 can be represented a variety of ways. Examples are shown in FIG. 8. Furthermore, it is contemplated that the calculations performed in accordance with the butterfly functions shown can be scaled. The scale can be applied at any stage of the computations so long as the scaling is consistently applied to maintain the relationships among the outputs. For example, a scale factor can be applied at each input immediately prior to each output or at some common stage in between the inputs and outputs.

The IW/IDCT processes described in FIG. 2 through FIG. 8 can be represented by mathematical formulae shown in FIGS. 9a and 9b. For example, the equation 905 illustrates the computation for each block location (x,y) where P(x,y) is the pixel at that location and Q(h,v) is the weighted DCT coefficient at each location (h,v). Equation 905 corresponds to the IW/IDCT process applied to an 8×8 block, as described in FIG. 2, in which the ordering is the horizontal operation 906 (corresponding to e.g., step 205, FIG. 2) followed by the vertical operation 907 (corresponding to e.g., steps 210, 215, FIG. 2). Equation 910 represents another embodiment of a two dimensional implementation to generate a ¼ image in which the vertical operation 911 is performed before the horizontal operation 912. Block 915 defines the parameters used to describe the equations 905, 910.

Similarly, FIG. 9b, specifically equations 920 and 925 represent embodiments of two-dimensional IW/IDCTs performed during the process described by FIG. 5. In equation 920, the vertical operation 921 (corresponding to e.g., steps 505, 515, FIG. 5) is initiated prior to the horizontal operation 922 (corresponding to e.g., step 510, FIG. 5) and in equation 925 the horizontal operation 926 (corresponding to, e.g., steps 505, 510) is initiated before the vertical operation 927 (corresponding to, e.g., step 515). The embodiments described implement one-dimensional IW/IDCTs (i.e., a horizontal IW/IDCT and a vertical IW/IDCT). However, as is illustrated above in FIGS. 9a and 9b, it is contemplated that the IW/IDCTs can be applied two-dimensionally.

The invention has been described in conjunction with the preferred embodiment. It is apparent that numerous alternatives, modifications, variations and uses will be apparent to those skilled in the art, in light of the foregoing description.

What is claimed is:

1. A method for performing ¼ size decoding of an encoded digital image comprising the steps of:

applying a horizontal 4-point combined inverse weighting function and inverse discrete cosine transform (DCT) to a horizontally lower frequency half of an input block of coefficients to produce a second block;

setting a vertically higher frequency half of the second block to a value of zero;

applying a vertical 8 point combined inverse weighting function and inverse discrete cosine transform to the second block; and extracting even rows as output to produce a block ¼ size of input block.

2. The method as set forth in claim 1, wherein the input block comprises an m×n matrix and the step of applying a horizontal 4-point combined inverse weighting function n≧4, m≧4 and inverse discrete cosine transform is applied to four rows of lower frequency coefficients.

3. The method as set forth in claim 1, wherein the input block comprises an m×n matrix where n≧8 and m≧4 and the step of setting sets the four rows of vertically higher frequency coefficients to zero.

4. The method as set forth in claim 1, wherein the steps of applying a horizontal 4-point combined inverse weighting function and inverse discrete cosine transform, setting, applying a vertical 8-point inverse weighting function and inverse discrete cosine transform and extracting are performed according to the following equation:

$$P(x, y) = \frac{1}{4} \sum_{v=0}^{3} \left\{ \frac{C'(v)}{w(v)} \cos \frac{\pi v(4y+1)}{16} \left[ \sum_{h=0}^{3} \left( \frac{C'(h)}{w(h)} \cos \left( \frac{\pi h(2x+1)}{8} \right) Q''(h, v) \right) \right] \right\}$$

where P(x,y) represents the pixel value at location (x,y); C'(h)=1 when h=0 or √2 when h=1,2,3; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); w(3)=1/(2*CS5); a CSm=cos(mπ/16).

5. A method for performing ¼ size decoding of an encoded digital image comprising the steps of:

setting a vertically higher frequency half of an input block to a value of zero;

applying a vertical 8-point combined inverse weighting function and inverse discrete cosine transform to produce a second block;

applying a horizontal 4-point combined inverse weighting function and inverse discrete cosine transform to a horizontally lower frequency half of the second block of coefficients; and extracting even rows as output to produce a block ¼ size of input block.

6. The method as set forth in claim 5, wherein the steps of applying a horizontal 4-point combined inverse weighting function and inverse discrete cosine transform, setting, applying a vertical 8-point inverse weighting function and inverse discrete cosine transform and extracting are performed according to the following equation:

$$P(x, y) = \frac{1}{4}\sum_{h=0}^{3}\left\{\frac{C'(h)}{w(h)}\cos\frac{\pi h(2x+1)}{8}\left[\sum_{v=0}^{3}\left(\frac{C'(v)}{w(v)}\cos\left(\frac{\pi v(4y+1)}{16}\right)\right)Q''(h,v)\right]\right\}$$

where P(x,y) represents the pixel value at location (x,y); C'(h)=1 when h=0 or √2 when h=1,2,3; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); w(3)=1/(2*CS5); and CSm=cos(mπ/16).

7. A method for performing ¼ size decoding of an encoded digital image comprising the steps of:
  applying a horizontal 4-point combined inverse weighting function and inverse discrete cosine transform to a horizontally lower frequency half of an input block of sum and difference coefficients to produce a second block;
  generating a sum of sum and difference coefficients to produce a third block;
  applying a vertical 4-point combined inverse weighting function and inverse discrete cosine transform to the third block; and
  wherein the steps of applying a horizontal 4-point combined inverse weighting function and inverse discrete cosine transform, generating, applying a vertical 4-point combined inverse weighting function and inverse discrete cosine transform are performed according to the following equation:

$$P(x, y) = \frac{1}{4}\sum_{v=0}^{3}\left\{\frac{C'(v)}{w(2v)}\cos\frac{\pi v(2y+1)}{8}\left[\sum_{h=0}^{3}\left(\frac{C'(h)}{w(h)}\cos\left(\frac{\pi h(2x+1)}{8}\right)\right)(Q'(h,v)+Q''(h,v+4))\right]\right\}$$

where P(x,y) represents the pixel value at location (x,y); C'(h)=1 when h=0 or √2 when h=1,2,3; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); w(3)=1/(2*CS5); w(4)=7/8; w(6)=CS4/CS2; and CSm=cos(mπ/16).

8. The method as set forth in claim 7, wherein the input block comprises two m×n matrices where n≧4 and m≧4 and the step of applying a horizontal 4-point combined inverse weighting function and inverse discrete cosine transform is applied to four rows of lower frequency coefficients.

9. The method as set forth in claim 7, wherein the input block comprises two m×n matrices where n≧4 and m≧4 and the step of applying a vertical 4-point inverse weighting function and inverse discrete cosine transform is applied to four rows of sums of sum and difference coefficients.

10. A method for performing ¼ size decoding of an encoded digital image comprising the steps of:
  generating a sum of sum and difference coefficients to produce a second block;
  applying a horizontal 4-point combined inverse weighting function and inverse discrete cosine transform to a horizontally lower frequency half of the second block to produce a third block;
  applying a vertical 4-point combined inverse weighting function and inverse discrete cosine transform to the third block; and
  wherein the input block comprises 2 4×8 matrices and the steps of generating, applying a horizontal 4-point combined inverse weighting function and inverse discrete cosine transform, and applying a vertical 4-point combined inverse weighting function and inverse discrete cosine transform are performed according to the following equation:

$$P(x, y) = \frac{1}{4}\sum_{h=0}^{3}\left\{\frac{C'(h)}{w(h)}\cos\frac{\pi v(2x+1)}{8}\left[\sum_{v=0}^{3}\left(\frac{C'(v)}{w(2v)}\cos\left(\frac{\pi v(2y+1)}{8}\right)\right)(Q''(h,v)+Q''(h,v+4))\right]\right\}$$

where P(x,y) represents the pixel value at location (x,y); C'(h)=1 when h=0 or √2 when h=1,2,3; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); w(3)=1/(2*CS5); w(4)=7/8; w(6)=CS4/CS2; and CSm=cos(mπ/16).

11. A system for performing ¼ size decoding of an encoded digital image comprising an inverse weighting subcircuit and inverse discrete cosine transform circuit, said circuits configured to perform a horizontal 4-point combined inverse weighting function and inverse discrete cosine transform to a horizontally lower frequency half of an input block of coefficients to produce a second block, said circuits further configured to applying a vertical 8-point combined inverse weighting function and inverse discrete cosine transform to the second block to produce a third block, wherein a vertically higher frequency half of the second block is set to zero, and even rows of the third block are used as output to produce a block ¼ size of input block.

12. The system as set forth in claim 11, wherein the input block comprises an m×n matrix where n≧4 and m≧4 and the horizontal 4-point combined inverse weighting function and inverse discrete cosine transform is applied to four rows of lower frequency coefficients.

13. The system as set forth in claim 11, wherein the input block comprises an m×n matrix n≧8 and m≧4 and four rows of vertically higher frequency coefficients are set to zero in the second block.

14. The system as set forth in claim 11, wherein the horizontal 4-point combined inverse weighting function and inverse discrete cosine transform and vertical 8-point inverse weighting function and inverse discrete cosine transform comprise the following equation:

$$P(x, y) = \frac{1}{4}\sum_{v=0}^{3}\left\{\frac{C'(v)}{w(v)}\cos\frac{\pi v(4y+1)}{16}\left[\sum_{h=0}^{3}\left(\frac{C'(h)}{w(h)}\cos\left(\frac{\pi h(2x+1)}{8}\right)Q''(h,v)\right)\right]\right\}$$

where P(x,y) represents the pixel value at location (x,y); C'(h)=1 when h=0 or √2 when h=1,2,3; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); w(3)=1/(2*CS5); and CSm=cos(mπ/16).

15. A system for performing ¼ size decoding of an encoded digital image comprising an inverse weighting subcircuit and inverse discrete cosine transform circuit, said circuits configured to perform a vertical 8-point combined inverse weighting function and inverse discrete cosine transform to an input block to produce a second block, wherein a vertically higher frequency half of the input block is set to zero, said circuits further configured to apply a horizontal 4-point combined inverse weighting function and inverse discrete cosine transform to a horizontally lower frequency half of an input block of coefficients to produce a third block, wherein even rows of the third block are used as output to produce a block ¼ size of the input block.

16. The system as set forth in claim 15, wherein the horizontal 4-point combined inverse weighting function and inverse discrete cosine transform, vertical 8-point inverse weighting function and inverse discrete cosine transform comprise the following equation:

$$P(x, y) = \frac{1}{4}\sum_{h=0}^{3}\left\{\frac{C'(h)}{w(h)}\cos\left(\frac{\pi h(2x+1)}{8}\right)\left[\sum_{v=0}^{3}\left(\frac{C'(v)}{w(v)}\cos\left(\frac{\pi h(4y+1)}{16}\right)Q''(h, v)\right)\right]\right\}$$

where P(x,y) represents the pixel value at location (x,y); C'(h)=1 when h=0 or √2 when h=1,2,3; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); w(3)=1/(2*CS5); and CSm=cos(mπ/16).

17. A system for performing ¼ size decoding of an encoded digital image comprising an inverse weighting subcircuit and inverse discrete cosine transform circuit, said circuits configured to perform a horizontal 4-point combined inverse weighting function and inverse discrete cosine transform to a horizontally lower frequency half of an input block of sum and difference coefficients to produce a second block, and to perform a vertical 4-point inverse weighting function and inverse discrete cosine transform to a block comprising sums of sum and difference coefficients;

wherein the horizontal 4-point combined inverse weighting function and inverse discrete cosine transform and vertical 4-point inverse weighting function and inverse discrete cosine transform are performed according to the following equation:

$$P(x, y) = \frac{1}{4}\sum_{v=0}^{3}\left\{\frac{C'(v)}{w(2v)}\cos\frac{\pi v(2y+1)}{8}\left[\sum_{h=0}^{3}\left(\frac{C'(h)}{w(h)}\cos\left(\frac{\pi h(2x+1)}{8}\right)\right)(Q'(h, v) + Q''(h, v+4))\right]\right\}$$

where P(x,y) represents the pixel value at location (x,y); C'(h)=1 when h=0 or √2 when h=1,2,3; Q"(h,v)= 2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); w(3)=1/(2*CS5); w(4)=7/8; w(6)=CS4/CS2; and CSm=cos(mπ/16).

18. The system as set forth in claim 17, wherein the input block comprises two m×n matrices where m≧4 and n≧4 and the horizontal 4-point combined inverse weighting function and inverse discrete cosine transform is applied to four rows of lower frequency coefficients.

19. The system as set forth in claim 17, wherein the input block comprises two m×n matrices where m≧4 and n≧4 and the vertical 4-point inverse weighting function and inverse discrete cosine transform is applied to four rows of sums of sum and difference coefficients.

20. A system for performing ¼ size decoding of an encoded digital image comprising and inverse weighting subcircuit and inverse discrete cosine transform circuit, said circuits configured to perform a vertical 4-point inverse weighting function and inverse discrete cosine transform to a block comprising sums of sum and difference coefficients and to perform a horizontal 4-point combined inverse weighting function to produce a second block and perform an inverse discrete cosine transform to a horizontally lower frequency half of the second block;

wherein the input block comprises two 4×8 matrices and the horizontal 4-point combined inverse weighting function and inverse discrete cosine transform and vertical 4-point inverse weighting function and inverse discrete cosine transform are performed according to the following equation:

$$P(x, y) = \frac{1}{4}\sum_{h=0}^{3}\left\{\frac{C'(h)}{w(h)}\cos\frac{\pi v(2x+1)}{8}\left[\sum_{v=0}^{3}\left(\frac{C'(v)}{w(2v)}\cos\left(\frac{\pi h(2y+1)}{8}\right)\right)(Q'(h, v) + Q''(h, v+4))\right]\right\}$$

where P(x,v) represents the pixel value at location (x,v); C'(h)=1 when h=0 or √2 when h=1,2,3; Q"(h,v)= 2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); w(3)=1/(2*CS5); w(4)=7/8; w(6)=CS4/CS2; and CSm=cos(mπ/16).

21. A computer readable medium containing executable instructions which, when executed in a processing system, caused the system to perform the steps for performing ¼ size decoding of an encoded digital image, comprising:

applying a horizontal 4-point combined inverse weighting function and inverse discrete cosine transform to a horizontally lower frequency half of an input block of coefficients to produce a second block;

setting a vertically higher frequency half of the second block to a value of zero;

applying a vertical 8-point inverse weighting function and inverse discrete cosine transform (DCT) to the second block; and extracting even rows as output to produce a block ¼ size of input block.

22. The computer readable medium as set forth in claim 21, wherein the input block comprises and m×n matrix where m≧4 and n≧4 and the instruction of applying a horizontal 4-point combined inverse weighting function and inverse discrete cosine transform is applied to four rows of lower frequency coefficients.

23. The computer readable medium as set forth in claim 21, wherein the input block comprises and m×n matrix where m≧4 and n≧4 and the instruction of setting sets the four rows of higher frequency coefficients to zero.

24. The computer readable medium as set forth in claim 21, wherein the instructions of applying a horizontal 4-point combined inverse weighting function and inverse discrete cosine transform, setting, applying a vertical 8-point inverse weighting function and inverse discrete cosine transform and extracting comprise the following equation:

$$P(x, y) = \frac{1}{4}\sum_{v=0}^{3}\left\{\frac{C'(v)}{w(v)}\cos\frac{\pi h(4y+1)}{16}\left[\sum_{h=0}^{3}\left(\frac{C'(h)}{w(h)}\cos\left(\frac{\pi h(2x+1)}{8}\right)Q''(h,v)\right)\right]\right\}$$

where P(x,y) represents the pixel value at location (x,y); C'(h)=1 when h=0 or $\sqrt{2}$ when h=1,2,3; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); w(3)=1/(2*CS5); and CSm=cos(mπ/16).

25. The computer readable medium as set forth in claim 24, wherein the instructions of applying a horizontal 4-point inverse weighting function and inverse discrete cosine transform, setting, applying a vertical 8-point inverse weighting function and inverse discrete cosine transform comprise the following equation:

$$P(x, y) = \frac{1}{4}\sum_{h=0}^{3}\left\{\frac{C'(h)}{w(h)}\cos\frac{\pi v(2x+1)}{8}\left[\sum_{v=0}^{3}\left(\frac{C'(v)}{w(v)}\cos\left(\frac{\pi h(4y+1)}{16}\right)Q''(h,v)\right)\right]\right\}$$

where P(x,y) represents the pixel value at location (x,y); C'(h)=1 when h=0 or $\sqrt{2}$ when h=1,2,3; Q"(h,v)=2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); w(3)=1/(2*CS5); and CSm=cos(mπ/16).

26. A computer readable medium containing executable instructions which, when executed in a processing system, causes the system to perform the steps for performing ¼ size decoding of an encoded digital image, comprising:

setting a vertically higher frequency half of an input block to a value of zero;

applying a vertical 8-point inverse weighting function and inverse discrete cosine transform to produce a second block;

applying a horizontal 4-point combined inverse weighting function and inverse discrete cosine transform to a horizontally lower frequency half of the second block of coefficients; and extracting even rows as output to produce a block ¼ of input block.

27. A computer readable medium containing executable instructions which, when executed in a processing system, causes the system to perform the steps for performing ¼ size decoding of an encoded digital image, comprising:

applying a horizontal 4-point combined inverse weighting function and inverse discrete cosine transform to a lower half of an input block of sum and difference coefficients to produce a second block;

generating a sum and difference coefficients to produce a third block;

applying a vertical 4-point inverse weighting function and inverse discrete cosine transform to the third second block; and wherein the instructions of applying a horizontal 4-point combined inverse weighting function and inverse discrete cosine transform, setting, applying a vertical 4-point inverse weighting function and inverse discrete cosine transform and extracting comprise the following equation:

$$P(x, y) = \frac{1}{4}\sum_{v=0}^{3}\left\{\frac{C'(v)}{w(2v)}\cos\frac{\pi v(2y+1)}{8}\left[\sum_{h=0}^{3}\left(\frac{C'(h)}{w(h)}\cos\left(\frac{\pi h(2x+1)}{8}\right)\right)(Q'(h,v) + Q''(h,v+4))\right]\right\}$$

where P(x,y) represents the pixel value at location (x,y); C'(h)=1 when h=0 or $\sqrt{2}$ when h=1,2,3; Q"(h,v)= 2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); w(3)=1/(2*CS5); w(4)=7/8; w(6)=CS4/CS2; and CSm=cos(mπ/16).

28. The computer readable medium as set forth in claim 27, wherein the input block comprises two 4×8 matrices and the instruction of applying a horizontal 4-point combined inverse weighting function and inverse discrete cosine transform is applied to four rows of lower frequency coefficients.

29. The computer readable medium as set forth in claim 27, wherein the input block comprises two 4×8 matrices and the instruction of applying a vertical 4-point inverse weighting function and inverse discrete cosine transform is applied to four rows of sums of sum and difference coefficients.

30. A computer readable medium containing executable instructions which, when executed in a processing system, causes the system to perform the steps for performing ¼ size decoding of an encoded digital image, comprising:

generating a sum of sum and difference coefficients to produce a second block;

applying a vertical 4-point inverse weighting function and inverse discrete cosine transform to the second block to produce a third block;

applying a horizontal 4-point combined inverse weighting function and inverse discrete cosine transform to a lower half of an third block of sum and difference coefficients; and wherein the instructions of applying a horizontal 4-point combined inverse weighting function and inverse discrete cosine transform, setting, applying a vertical 4-point inverse weighting function and inverse discrete cosine transform and extracting comprise the following equation:

$$P(x, y) = \frac{1}{4}\sum_{h=0}^{3}\left\{\frac{C'(h)}{w(h)}\cos\frac{\pi v(2x+1)}{8}\left[\sum_{v=0}^{3}\left(\frac{C'(v)}{w(2v)}\cos\left(\frac{\pi h(2y+1)}{8}\right)\right)(Q'(h,v) + Q''(h,v+4))\right]\right\}$$

where P(x,y) represents the pixel value at location (x,y); C'(h)=1 when h=0 or $\sqrt{2}$ when h=1,2,3; Q"(h,v)= 2Q(h,v) when h=0, v=0, or Q(h,v) when h≠0 or v≠0, Q(h,v) represents the weighted DCT coefficient at each location (h,v); w(0)=1; w(1)=CS4/(4*CS7*CS2); w(2)=CS4/(2*CS6); w(3)=1/(2*CS5); w(4)=7/8; w(6)=CS4/CS2; and CSm=cos(mπ/16).

* * * * *